United States Patent [19]
Hartley et al.

[11] 3,938,664
[45] Feb. 17, 1976

[54] SIEVES

[75] Inventors: Kenneth Hartley, Seascale; Arthur Edward McIntosh, Gosforth, both of England

[73] Assignee: United Kingdom Atomic Energy Authority, London, England

[22] Filed: Aug. 23, 1973

[21] Appl. No.: 390,750

[30] Foreign Application Priority Data
Aug. 23, 1972 United Kingdom............. 39316/72

[52] U.S. Cl............................... 209/233; 209/392
[51] Int. Cl.² .......................................... B07B 1/00
[58] Field of Search............ 209/233, 235, 237, 44, 209/486, 1, 2, 392, 401, 363, 364

[56] References Cited
UNITED STATES PATENTS

| 359,498 | 3/1887 | Card | 209/480 X |
| 2,068,783 | 1/1937 | Wendell | 209/44 |
| 2,922,588 | 1/1960 | Hoesch | 209/323 X |
| 3,390,770 | 7/1968 | Fahlstrom | 209/233 |

*Primary Examiner*—Robert Halper
*Attorney, Agent, or Firm*—Larson, Taylor and Hinds

[57] ABSTRACT

A sieve unit, particularly for spherical nuclear fuel particles, in which the particles are fed to a bed of spheres disposed in layers on a mesh screen to provide, when efficiently packed, an effective pore path of a diameter not greater than that of the mesh screen and means are provided for vibrating the unit so that the spheres are efficiently packed.

5 Claims, 1 Drawing Figure

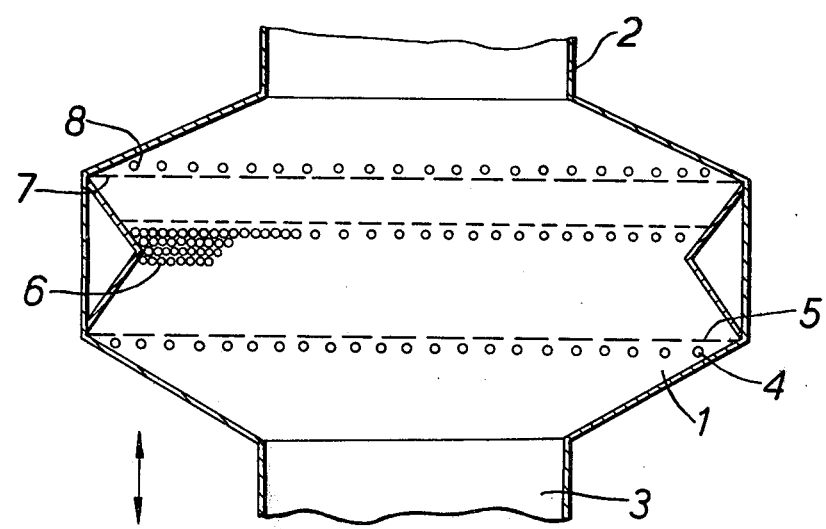

SIEVES

BACKGROUND OF THE INVENTION

Vibrocompaction is an attractive process for the manufacture of nuclear fuels for fast reactors. The process can involve the high energy breakdown of irregular fuel particles within the fuel pins or, alternatively, a coarse fraction of fuel particles can be vibrated into its optimum packing arrangement using low energy vibration and a second component infiltrated into the spaces between the large particles once again using low energy vibration.

The second process is very attractive if the two components can be simply weighed and then packed to a predictable length within the pin but the success of the second process depends upon the particles which are infiltrated into the spaces between the large particles being of the correct size and shape. The infiltration of fines is reliant upon the small number of holes at the top of the coarse fuel column remaining open until all the fine particles have moved into position and only a small quantity of incorrect particles are needed to block the column and stop or severely reduce the rate of infiltration. Unfortunately current manufacturing processes do not always produce fine particles which can be guaranteed to infiltrate into position. In the instance of non-spherical fine particles, needles and flat particles can pass through existing sieves and in the instance of spherical gel-precipitation type fine particles, units of 2 to 6 particles can be linked together in a string and yet be able to pass axially through existing sieves. Furthermore, in both types of fine particles, fibres, brush hairs and other plant debris passes through the fine sieves and into the product. In addition to the normal sieving operations, therefore, means is needed which will effectively prevent undesirably shaped particles and debris from getting into the fine particle product. The present invention seeks to provide such means.

SUMMARY OF THE INVENTION

According to the present invention a sieve unit for spherical particles comprises a bed of spheres disposed in efficiently packed layers on a mesh screen, the spheres being of a size which packed efficiently provide an effective pore path of a diameter not greater than that of the mesh screen, and means for vibrating the spheres.

Although the coarse particles in a vibrocompaction process are not always spherical in shape, a quantative relationship exists between the sizes of the coarse and fine particles if infiltration is to be possible. The fine particles should be between 1/7 and 1/10 of the diameter of the coarse particles. For spheres or near spheres such as are produced by the sol-gel or gel-precipitation processes, a relationship based on solid geometry exists. The effective pore path diameter Pt, ie the triangular holes formed by the orthorhombic packing of spheres, is related to the large sphere size by the expression:

$$Pt = d_c \frac{2}{\sqrt{3}} - 1 = 0.154 \, d_c$$

where $d_c$ = the diameter of the large spheres

Fine fraction spheres of size $0.154 \, d_c$ or less should therefore readily infiltrate into position. Accordingly if a bed of spheres of the appropriate diameter are placed on a suitable screen and vibrated so as to pack efficiently, this bed will stop the passage of particles which have any axis significantly greater than the effective pore path diameter.

To illustrate the invention a 1 in. deep bed of 1 mm stainless steel spheres was formed on a 170 mesh screen. Fine particles which had already passed through the bare screen were vibrated at 60 cycles per second and an amplitude just below that at which the top layer of spheres visibly moved. The material which did not pass through the stainless steel spheres amounted to about 0.3% of the weight of the particles. It was confirmed by microscopic examination that the particles were of a shape unsuitable for infiltration.

The untreated particles had on two previous occasions caused a blockage in the fuel column terminating infiltration whereas the treated particles infiltrated rapidly and yielded a higher column packed density.

Similarly a batch of 120 grams of crushed fuel particles were treated in the same sieve unit. A sample of 30 grams of the 90 grams which passed through the unit infiltrated a 20 inch fuel column in 15 mts whereas the remaining 30 grams after separation from the stainless steel spheres took 28 mts to infiltrate.

Although the above experiments were performed on a mesh screen which will itself retain oversize particles it has been found that sieving is quicker but not less efficient using a larger mesh screen provided the spheres are correctly selected for the effective pore path diameter required and are not of a size to sit in the holes of the mesh screen.

DESCRIPTION OF THE DRAWING

A sieve unit in accordance with the invention is shown by way of example in the accompanying drawing which is a diagrammatic section.

DESCRIPTION OF THE PREFERRED EMBODIMENT

The sieve unit comprises a bowl 1 having an entry 2 and outlet 3. The bowl 1 is shaped to limit channelling. Across the bowl 1 are fitted in ascending order a support mesh 4, a lower screen 5 of 10 mesh (850 µ) a 1 inch layer of 1 mm stainless steel balls 6, an upper screen 7 of 18 mesh (850 µ) and a retaining mesh 8. The mesh 4 and 8 are strong enough to take the load of the steel balls 6. Means are provided for applying either horizontal or vertical vibration to the sieve unit at 50 cycles per second, for example. Shaking tables may be used for this purpose. Alternatively the sieve unit may be provided with a stem which is fitted into a chuck connected to an electromagnetic or pneumatic vibrating motor.

The spheres are not necessarily ball bearings. For example coarse fuel particles may be used of the size through which the fine material is required ultimately to infiltrate.

Separation of retained material from the sieve unit may sometimes be achieved by inverting the unit and vibrating it so that debris and undesirably shaped particles fall away from the spheres. The bed of spheres is then prepared for re-use by uprighting and vibrating the spheres into position. However separation may more generally be achieved by one of the following methods.

1. Pour the spheres on to a coarse screen (about 600 μ for 1 mm spheres) so as to produce a bed of spheres not more, and preferably less, than three spheres deep and shake.
2. Pour the spheres on to an inclined coarse screen (again about 600 μ for 1 mm spheres) so that the spheres roll to the bottom and retained material drops through.
3. Pick up steel spheres with an electro-magnet.

The application of the invention is not limited to the sieving of nuclear fuel particles. It can be considered in any operation where blinding of screens is a problem. On an industrial scale it may well have advantages in terms of power saving if a vibrating bed of spheres in accordance with the invention is used in place of conventional shaking screens.

We claim:

1. A sieve unit for separating spherical particles from undesirably shaped particles and debris, the unit comprising a bed of uniformly sized spheres disposed in efficiently packed layers in a substantially orthorhombic formation on a mesh screen, the spheres being of a size which packed efficiently provide an effective pore path of a diameter not greater than that of the mesh screen, and means for vibrating the spheres so as not to destroy the substantially orthorhombic formation.

2. A sieve unit for spherical particles, as claimed in claim 1, wherein the spheres are stainless steel balls.

3. A sieve unit for spherical particles, as claimed in claim 1, wherein the spheres are nuclear fuel particles.

4. A sieve unit for spherical particles, as claimed in claim 1, including a support mesh mounted below said mesh screen for taking the load of the spheres.

5. A method of grading nuclear fuel particles in which the particles are fed to a sieve unit comprising a bed of uniformly sized spheres disposed in layers on a mesh screen to provide when efficiently packed an effective pore path of a diameter not greater than that of the mesh screen, vibrating the sieve unit so that the spheres are efficiently packed in a substantially orthorhombic formation so as to provide said effective pore path, and collecting the fuel particles which pass through the unit.

* * * * *